(12) United States Patent
Chang (10) Patent No.: US 10,021,276 B1
(45) Date of Patent: Jul. 10, 2018

(54) METHOD AND DEVICE FOR PROCESSING VIDEO, ELECTRONIC DEVICE AND STORAGE MEDIUM

(71) Applicant: BEIJING KINGSOFT INTERNET SECURITY SOFTWARE CO., LTD., Beijing (CN)

(72) Inventor: Hanwen Chang, Beijing (CN)

(73) Assignee: BEIJING KINGSOFT INTERNET SECURITY SOFTWARE CO., LTD., Beijing (CN)

( * ) Notice: Subject to any disclaimer, the term of this patent is extended or adjusted under 35 U.S.C. 154(b) by 0 days.

(21) Appl. No.: 15/905,934

(22) Filed: Feb. 27, 2018

(30) Foreign Application Priority Data

Jun. 30, 2017 (CN) .......................... 2017 1 0531697

(51) Int. Cl.
*H04N 5/04* (2006.01)
*H04N 9/475* (2006.01)
*H04N 5/265* (2006.01)
*G06K 9/00* (2006.01)
*G06F 17/28* (2006.01)
*G10L 15/26* (2006.01)

(52) U.S. Cl.
CPC .............. *H04N 5/04* (2013.01); *G06F 17/28* (2013.01); *G06K 9/00275* (2013.01); *G06K 9/00288* (2013.01); *G10L 15/265* (2013.01); *H04N 5/265* (2013.01)

(58) Field of Classification Search
CPC .......... H04N 5/04; H04N 5/265; H04N 9/475; G06F 17/28; G06K 9/00275; G06K 9/00288; G10L 15/265
USPC .................. 348/512, 515; 382/224, 190, 103
See application file for complete search history.

(56) References Cited

U.S. PATENT DOCUMENTS 8,229,134 B2 * 7/2012 Duraiswami .......... H04R 1/406
348/515
8,558,952 B2 * 10/2013 Ishikawa ................. G10L 25/48
348/512

* cited by examiner

*Primary Examiner* — Sherrie Hsia
(74) *Attorney, Agent, or Firm* — Hodgson Russ LLP (57) ABSTRACT

Embodiments of the present disclosure provide a method and a device for processing a video, an electronic device and a storage medium. The method includes the followings. A target recognition is performed to A first video segments and B first speech segments to obtain M second video segments and N second speech segments. A speech processing is performed to the N second speech segments to obtain N target speech text files. First representation information is extracted from the M second video segments to obtain Q pieces of first representation information. A second sound matched with the target character is determined according to the Q pieces of first representation information. The second sound is merged with the N target speech text files to obtain N target speech segments.

20 Claims, 5 Drawing Sheets

METHOD AND DEVICE FOR PROCESSING VIDEO, ELECTRONIC DEVICE AND STORAGE MEDIUM

CROSS-REFERENCE TO RELATED APPLICATIONS

This application claims priority to and benefits of Chinese Patent Application Serial No. 201710531697.9, filed with the State Intellectual Property Office of P. R. China on Jun. 30, 2017, the entire content of which is incorporated herein by reference.

TECHNICAL FIELD

The present disclosure relates to the field of video processing technology, and more particularly, to a method and a device for processing a video, an electronic device and a storage medium.

BACKGROUND

With the development of image processing technology and speech processing technology, an image or a speech may be processed through a related application software or plug-in. For example, under a travel or conference scenario, an interpreting may be performed to an inputted speech. Or, under a chat scenario, a sound change may be performed to a speech, and an image processing may be performed to an inputted image, such as beautifying or changing face.

However, practicability of the related application software and plug-in is poor.

SUMMARY

Embodiments of the present disclosure provide a method for processing a video. The method includes the followings.

A target recognition is performed to A first video segments and B first speech segments to obtain M second video segments and N second speech segments. The A first video segments and the B first speech segments are obtained by dividing an inputted video. The M second video segments include a first face image of a target character. The N second speech segments include a first sound of the target character. A is an integer greater than 1. B is a positive integer, M is a positive integer less than or equal to A, and N is a positive integer less than or equal to B.

A speech processing is performed to the N second speech segments to obtain N target speech text files. The N second speech segments correspond to the N target speech text files one by one.

First representation information of the first face image is extracted from the M second video segments to obtain Q pieces of first representation information. Q is an integer greater than or equal to M.

A second sound matched with the target character is determined according to the Q pieces of first representation information.

The second sound is merged with the N target speech text files to obtain N target speech segments. The N target speech text files correspond to the N target speech segments one by one.

Embodiments of the present disclosure provide an electronic device. The electronic device includes a housing, a processor, a memory, a circuit board and a power supply circuit. The circuit board is enclosed by the housing. The processor and the memory are positioned on the circuit board. The power supply circuit is configured to provide power for respective circuits or components of the electronic device. The memory is configured to store executable program codes. The processor is configured to run a program corresponding to the executable program codes by reading the executable program codes stored in the memory, to perform the above method for processing a video provided.

Embodiments of the present disclosure provide a non-transitory computer readable storage medium, having computer programs stored therein. When the computer programs are executed by a processor, the above method for processing a video provided is executed.

Embodiments of the present disclosure provide an application. When the application is running, the above method for processing a video provided is executed.

BRIEF DESCRIPTION OF THE DRAWINGS

In order to further clearer describe technical solutions of embodiments of the present disclosure, simply descriptions will be made to drawings necessitated by describing embodiments of the present disclosure. Obviously, the drawings are merely some embodiments of the present disclosure, and other drawings may be obtained by those skilled in the art without any inventive labors according to these drawings.

DETAILED DESCRIPTION

Clear and complete descriptions will be made to technical solutions of embodiments of the present disclosure with reference to drawings of embodiments of the present disclosure. Obviously, the described embodiments are merely parts of embodiments instead of all embodiments of the present disclosure. Based on the embodiments illustrated in the present disclosure, other embodiments obtained by those skilled in the art without any inventive labor are all covered by the scope of the present disclosure.

Terms such as "first", "second" and "third" used in the specification, in claims and in drawings are configured herein for distinguishing different subjects, but not for showing a particular sequence. Furthermore, the terms such as "include", "comprise" and any other variations thereof are intended to be non-exclusive. For example, a process, a method, a system, a product or a device including or comprising a sequence of blocks or units is not limited to include or comprise the listed blocks or unit, instead, they alternatively further include or comprise other blocks and units that are not listed or alternatively further include inherent blocks or units of the process, the method, the system, the product or the device.

Term such as "embodiments" referred in the present disclosure means that, particular features, structures and characteristics described in combination with embodiments may be covered in at least one embodiment of the present disclosure. Usages of the term for many times in the specification are not necessary to refer to a same embodiment or same embodiments, and they are not independent embodiments mutually exclusive with other embodiments or unimportant embodiments. It may be explicitly or implicitly understood by those skilled in the art that, embodiments described herein can be combined with other embodiments.

The electronic device described in embodiments of the present disclosure may include a smart phone (such as an Android phone), a tablet computer, a palmtop computer, a laptop, a mobile internet device (MID), a wearable device or other electronic device. The above examples are exemplary but not exhaustive. The electronic device described in embodiments includes but not limited to the above.

Embodiments of the present disclosure provide a method and a device for processing a video, an electronic device and a storage medium, for solving a problem of a poor application practicability caused by a difficulty in recognizing character's features in a video. The method, the device, the electronic device and the storage medium will be described in detail as follows.

Figure 1:
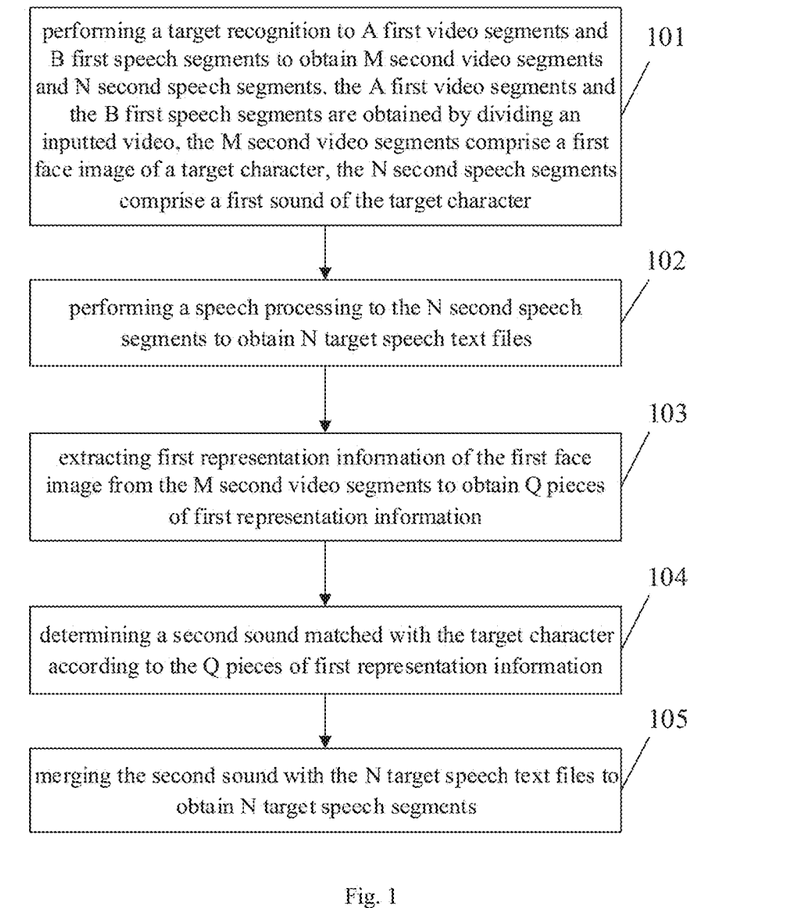
FIG. 1 is a flow chart illustrating a method for processing a video provided in embodiments of the present disclosure.

With reference to FIG. 1, FIG. 1 is a flow chart illustrating a method for processing a video provided in embodiments of the present disclosure. The method may include the followings.

At block 101, a target recognition is performed to A first video segments and B first speech segments to obtain M second video segments and N second speech segments. The A first video segments and the B first speech segments are obtained by dividing an inputted video. The M second video segments may include a first face image of a target character. The N second speech segments may include a first sound of the target character.

In embodiments of the present disclosure, A is an integer greater than 1, B is a positive integer, M is a positive integer less than or equal to A. and N is a positive integer less than or equal to B. In embodiments, based on the first face image and the first sound of the target character, when the M second video segments including the first face image are obtained by performing the target recognition to the A first video segments and the N second speech segments including the first sound are obtained by performing the target recognition to the B first speech segments, a block 102 is executed, otherwise, it ends.

In embodiments of the present disclosure, the A first video segments and the B first speech segments are obtained by decoding the inputted video. How to divide the inputted video is not limited in embodiments. An alternative technology for dividing the inputted video into the A first video segments is ffmpeg (Fast Forward Mpeg (Moving Picture Experts Group)). By dividing the inputted video into the A first video segments and the B first speech segments, a complexity of processing the whole inputted video may be reduced, thereby improving a video processing speed.

In embodiments of the present disclosure, feature extraction algorithms such as Histogram of Orientated Gradient (HOG), Local Binary Pattern (LBP), Gabor wavelet transform. Haar-like may be used to perform a face recognition, which of them may be used in embodiments is not limited.

Alternatively, feature values of the video segments are extracted, and an integral algorithm is performed to an inputted image according to the feature values to obtain an integral image. Enhanced classifiers for classifying faces or non-faces in the integral image based on adaptive enhancement algorithm are adopted. The enhanced classifiers for classifying faces are connected in series through a waterfall typed cascading classifier, so as to obtain a face image. It is judged whether the face image is a target face. If the face image is the target face, it is determined that the video segments include the target face. With the method, different features are calculated with same calculation time in various scales, such that a large amount of regions to be detected are disqualified rapidly, an average detecting overhead is reduced, thereby improving face recognizing efficiency.

It is to be noted that, when the inputted video is divided into the A first video segments and the B first speech segments, a starting point and a stopping point may be marked for the video segments and the speech segments. By marking the starting points and the stopping points, in one hand, the video segments and the speech segment are distinguished, and in other hand, it is advantageous to perform a merging processing to obtain an outputted video. When A is equal to B, the starting point and the stopping point of a playing period of the video segments is same with those of the playing period of the speech segments, which is benefit to a subsequent merging and outputting the outputted video.

In embodiments of the present disclosure, in addition to being a video, the inputted video may also be dynamic images including a plurality of sequential frames or image files captured continually. The inputted video may be uploaded to a server end, or may be loaded to a local end, or may be updated to the server end from the local end. When the inputted video is uploaded to the server end, because a large amount of marks are used for recognizing subjects, scenes and character's expressions in the inputted video by the server, it is useful for improving an accuracy of recognizing representation information.

At block 102, a speech processing is performed to the N second speech segments to obtain N target speech text files.

In embodiments of the present disclosure, each of the speech segments corresponds to one of the target speech text files. Words included in the speech segments may be extracted through the speech processing, and the words may be translated, adjusted and changed, and keywords in the words may also be extracted and extended.

Alternatively, a speech recognition is performed to the N second speech segments to obtain N text files. Furthermore, the N text files are translated according to a specified language to obtain the N target speech text files.

Each of the speech segments corresponds to one of the text files. Each of the text files corresponds to one of the target speech text files. For example, it is assumed that the specified language is English, the language of the inputted video is Chinese, and there are 3 speech segments including the first sound, the 3 speech segments are converted to text files firstly to obtain 3 text files in Chinese. Furthermore, 3 target speech text files are obtained by translating the 3 text files according to a correspondence between English and Chinese, thus the speech segments of the inputted video are translated.

At block 103, first representation information of the first face image is extracted from the M second video segments to obtain Q pieces of first representation information.

In embodiments of the present disclosure, a depth learning frame of face recognition may be used to extract facial features of the first face image. For different parts of the face, different scaled features are extracted and then are classified through neural liked network classifiers. Finally, various facial features are obtained. The various facial features include gender, expression, facial organ state, similarity with faces in other face images and the like. It is to be illustrated that, the first representation information also carries a playing period of the first representation information among the playing period of the inputted video.

In embodiments of the present disclosure, Q is an integer greater than or equal to M. The first representation information may be in a form of vector, or may be in a form of text, such as in JSON (JavaScript Object Notation) format, or may be in a form of a sequence of representation components, which are not limited in embodiments of the present disclosure. The first representation information at least includes: K dimensions including expression features, age features, gender features, facial organ features and the like, where K is a positive integer.

Alternatively, a first representation information extraction is performed to the first face image of each of the M second video segments or the first face image of each of L frames including the first face image in the M second video segments, so as to obtain the Q pieces of first representation information.

L is a positive integer. As there are many frames included in the video segments, and there are certain differences between frames, the first representation information of the video segments may be coarsely extracted when taking a video segment as a unit to extract the first representation information of the first face image, while the first representation information of the first face image may be finely extracted by taking a frame as a unit. The first representation information of the video segments may be further classified, so as to improve an accuracy of judging character's features of the target character.

Alternatively, the first representation information at least includes multi-dimensions, such as expression features, gender features, facial organ features and the like. Taking a target dimension of the first representation information as an example, the target dimension is any one of the multi-dimensions. Alternatively, the facial features are matched with feature parameters of the target dimension, so as to obtain a plurality of matching values. Some of the matching values greater than or equal to a preset threshold are representation probability values corresponding to the target dimension.

Specific formats of the representation probability values are not limited in embodiments, which may be in a percent format or in a decimal format. That is to say, the facial features of the first face image are matched with the feature parameters of each dimension respectively, so as to obtain a plurality of matching values. In each dimension, those greater than or equal to the preset threshold selected from the matching values are determined as the representation probability values corresponding to the individual dimension. Furthermore, the facial features are represented through the probability values, thereby improving an accuracy of representing the facial features.

Figure 2:
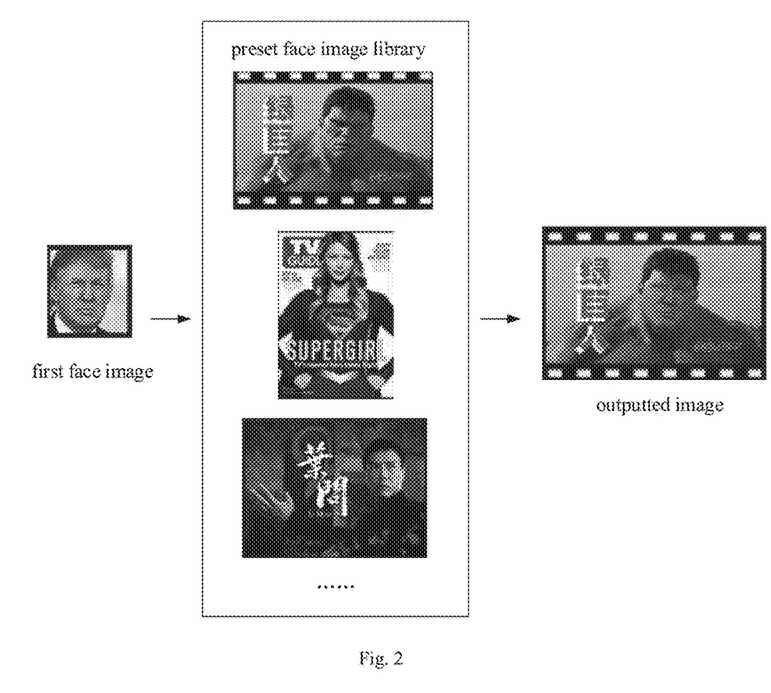
FIG. 2 a schematic diagram illustrating a method for changing faces provided in embodiments of the present disclosure.

For example, it is assumed that the preset threshold is 10%, and the first representation information includes the expression features, the gender features and the facial organ features. In an image of Incredible Hulk illustrated in FIG. 2, the facial features of Hulk are obtained, and the facial features are matched with feature parameters of the expression features, the gender features and the facial organ features respectively. The feature parameters for example include anger, happiness, sadness, male, female, double-fold eyelids, high-bridged nose, no glasses, square face and the like. The matching values are that anger of the expression features is 80%, sadness of the expression features is 5%, male of the gander features is 98%, female of the gender features is 2%, square face of the facial organ features is 70%, no glasses is 100%. As the present threshold is set to be 10%, the first representation information of Hulk is {anger 80%, male 98%, square face 70%, no glasses 100%}.

Alternatively, at least one representation probability value corresponding to each of the N dimensions is obtained by estimating the facial features, so as to obtain M representation probability values. The M representation probability values are weighted, so as to obtain the first representation information. M is greater than or equal to N. That is to say, various facial features are taken into consideration fully and comprehensively, to make an optimal strategy, and thus to improve an accuracy of judging the facial expressions.

For example, when the probability that the expression feature is happiness is 60%, and the probability that the action feature is smile is 80%, the weight of the probability of the happiness included in the expression feature may be increased and a weighted representation probability of happiness included in the express features may be set as 80%. Alternatively, when the probability that the expression feature is grimness is 60%, the probability of wearing glasses is 75%, and the probability of having moustache is 80%, the weight of the probability of grimness included in the expression feature may be increased and a weighted representation probability of grimness may be set to be 80%.

At block 104, a second sound matched with the target character is determined according to the Q pieces of first representation information.

Alternatively, the Q pieces of first representation information are classified to obtain P classes of the first representation information. The second sound is determined according to one of the P classes which has a longest playing period among the inputted video.

P is a positive integer less than or equal to Q. That is to say, the P classes of first representation information are obtained by classifying the Q pieces of first representation information according to differences between the video segments or between the frames corresponding to each classification of representation information. And, the second sound is determined according to one of the P classes with the longest playing period among the playing period of the inputted video.

For example, if there are 10 video segments including the first face image of the target character in the inputted video, the first representation information of respective video segments is extracted. Differences between every two of a first video segment to a third video segment are less than a representation threshold, a difference between the third video segment and a fourth video segment is greater than the representation threshold, differences between every two of the fourth video segment to a seventh video segment are less than the representation threshold, a difference between the seventh video segment and an eighth video segment is greater than the representative threshold, and differences between every two of the eighth video segment to a tenth video segment are less than the first representation information, the differences between every two of the first video segment to the third video segment and differences between every two of the eighth video segment to the tenth video segment are less than the first representation information, the fourth video segment to the seventh video segment are classified as a first class of first representation information, and the first video segment to the third video segment and the eighth video segment to the tenth video segment are classified as a second class of the first representation information. It is assumed that the playing periods of the video segments are equal to each other, the playing period of the second class is greater than the playing period of the first class, thus the second sound is determined according to the second class of the first representation information.

For another example, it is assumed that a video segment includes 200 frames. The first representation information of each frame is extracted within a same video segment. Differences between every two of a $1^{st}$ frame to a $79^{th}$ frame are less than the representation threshold, a difference between the $79^{th}$ frame and a $80^{th}$ frame is greater than the representation threshold, differences between every two of $80^{th}$ frame to $200^{th}$ frame are less than the representation threshold. The $1^{st}$ frame to the $79^{th}$ frame are classified as a first class of first representation information, and the $80^{th}$ frame to the $200^{th}$ frame are classified as a second class of first representation information. Further, the first representation information may be classified. The playing period of the second class is longer than that of the first class, thus the second sound is determined according to the second class of first representation information.

Alternatively, sound information of the first sound is extracted from the N second speech segments to obtain R pieces of second representation information. Furthermore, the second sound is determined according to the Q pieces of first representation information and the R pieces of second representation information.

R is an integer greater than or equal to N. A method for extracting the second representation information of the first sound is not limited in embodiments. The second representation information may include gender, emotion, age, similarity to other speeches and the like. It is to be illustrated that, the second representation information further carries a playing period of the individual speech among the inputted video.

That is to say, the character's features of the target character are determined according to the first representation information of the first face image in the video segments and the speech features of the first sound in the speech segments, thereby further improving an accuracy of judging the character's features.

The second sound may be obtained by searching a preset sound library. The preset sound library includes various types of sounds. At least one second sound may be selected from the preset sound library according to the first representation information and/or second representation information of the target character. When more than one second sound is determined, a specifying instruction sent by the user is received, to determine a finally converted second sound, or all of the more than one second sound may be converted, such that the user can select one of them.

At block 105, the second sound is merged with the N target speech text files to obtain N target speech segments.

In the method for processing a video illustrated in FIG. 1, the inputted video is divided into the A first video segments and the B first speech segments, the M second video segments are obtained by selecting video segments including the first face image of the target character from the A first video segments, and the N second speech segments are obtained by selecting speech segments including the first sound of the target character from the B first speech segments. That is to say, by only extracting the video segments and the speech segments corresponding to the target character, extracting efficiency may be improved. The second sound matched with the target character is determined according to the first representation information of the first face image extracted from each of the M second video segments. The N target speech text files obtained by performing speech processing to the N second speech segments are matched with the second sound to obtain the N target speech segments (that is the target speech segments are played through the second sound), application practicability is improved.

Figure 3:
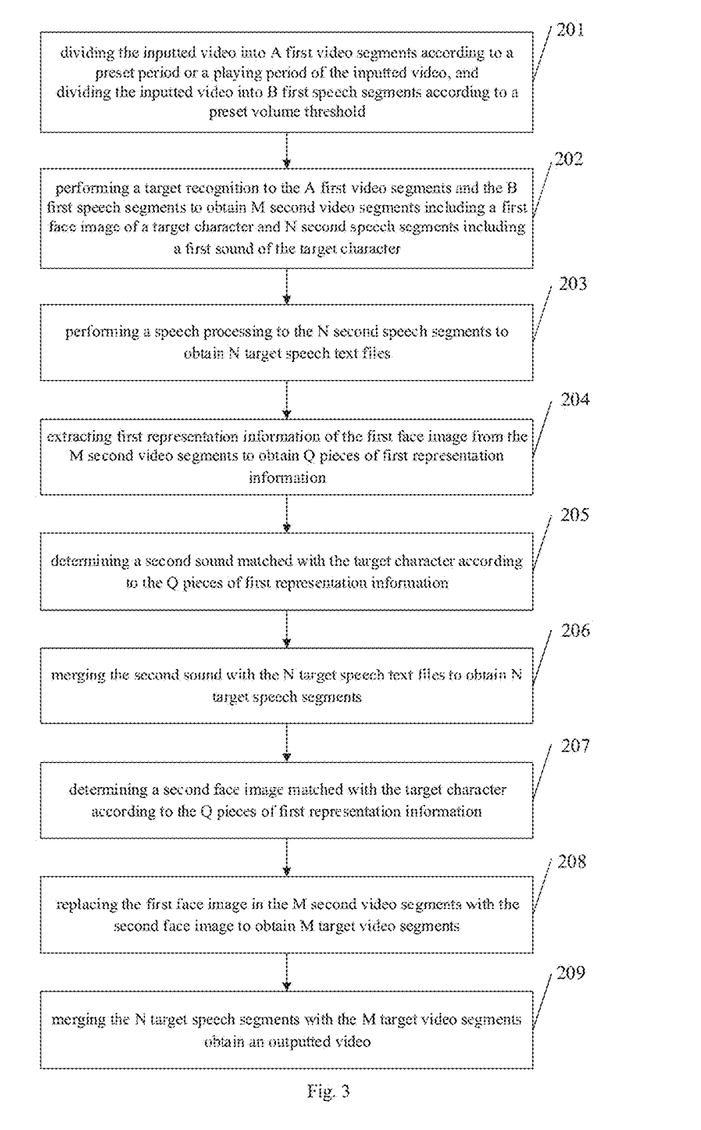
FIG. 3 is a flow chart illustrating another method for processing a video provided in embodiments of the present disclosure.

With reference to FIG. 3, FIG. 3 is a flow chart illustrating another method for processing a video provided in embodiments of the present disclosure. The method may include the followings.

At block 201, an inputted video is divided into A first video segments according to a preset period or a playing period of the inputted video, and the inputted video is divided into B first speech segments according to a preset volume threshold.

In embodiments of the present disclosure, the inputted video is divided into the A first video segments and the B first speech segments. The inputted video may be divided into A first video segments through alternative ffmpeg technology. How to divide the inputted video is not limited in embodiments. By dividing the inputted video, a complexity of processing the whole inputted video may be reduced, thereby improving a speed of processing images and speeches.

For example, if the preset period is 1 second, parts of the inputted video every continuous 1 second are the video segments. If the playing period of the inputted video is 10 seconds, and M is 5, parts of the inputted video every continuous 2 seconds are the video segments. By dividing the inputted video into a plurality of video segments, because the video segments are sequential and the time difference thereof are less, facial representation of the video segments are considered as coincident, thereby improving searching efficiency.

For another example, if the preset volume threshold is 0, when the volume reaches 0, it stops dividing the inputted video into the speech segments.

At block 202, a target recognition is performed to the A first video segments and the B first speech segments to obtain M second video segments including a first face image of a target character and N second speech segments including a first sound of the target character.

At block 203, a speech processing is performed to the N second speech segments to obtain N target speech text files.

At block 204, first representation information of the first face image is extracted from the M second video segments to obtain Q pieces of first representation information.

At block 205, a second sound matched with the target character is determined according to the Q pieces of first representation information.

At block 206, the second sound is merged with the N target speech text files to obtain N target speech segments. Each of the target speech text files corresponds to one of the target speech segments.

The blocks 202 to 206 may be referred to descriptions made to blocks 101 to 105 in a method for processing a video illustrated as FIG. 1, which are not elaborated herein.

At block 207, a second face image matched with the target character is determined according to the Q pieces of first representation information.

In embodiments, determining the second face image according to the Q pieces of first representation information may be realized by the followings. The second face image matched with the target character may be searched from a stored and preset face image library.

The preset face image library includes various types of face images. At least one second face image may be selected from the preset face image library according to character's features of the target character respectively. When more than one second face image are determined, a specifying instruction sent by a user may be received to determine a finally converted second face image, or all of the more than one second face image may be converted such that the user may select one of them.

Alternatively, sound information of the first sound is extracted from the N second speech segments to obtain R pieces of first representation information. The second face image is determined according to the Q pieces of first representation information and the R pieces of second representation information.

In other words, the second face image is determined according to the first representation information of the first face image in the video segments and speech features of the first sound in the speech segments, thereby further improving an accuracy of judging the character's features.

At block 208, the first face image in the M second video segments is replaced with the second face image to obtain M target video segments.

In embodiments, the second face image is used to replace the first face image in the M second video segments. Each of the video segments corresponds to one of the target video segments. For example, a schematic diagram illustrating a scene of changing faces shown in FIG. 2, the first face image of the inputted video is an image of Trump. Facial features of the image of Trump are acquired to determine the first representation information of the facial features as {anger 80%, male 98%, square face 70%, no glasses 100%}. It is assumed that face images of the Incredible Hulk, Superwoman and Ye Wen are included in the preset face image library, the second face image is determined as Hulk according to the first representation information and the first representation information of the face images included in the preset face image library. The face changing may be performed between the image of Trump and an image of Hulk. As can be seen from FIG. 2, the face image of Hulk is replaced with the face image of Trump.

Alternatively, the second face image in the target face images is pre-processed, so as to obtain a third face image. The facial features of the third face image are replaced with those of the first image face, so as to obtain a fourth face image. The fourth face image is rectified with a loss function to obtain a fifth face image. The fifth face image is merged with rest of the target face image except the second face image, to obtain an outputted image.

Pre-processing may include performing a face alignment, an image enhancement, a normalization and the like. By performing the face alignment to the second face image, a face image with proper facial organ positions may be obtained. The converted second face image is performed with anti-face-alignment, a face image with facial organ positions same with that of the second face image in an image corresponding to the target face image is obtained, thereby enhancing an image effect. The image enhancement is to improve quality of the face image, so as to not only make the image clearer in version, but also simplify processing and recognition through a computer. The normalization is to acquire the same size, and to normalize the face image with the same gray value range, so as to further improve the image effect.

When the pre-processing is the face alignment, in order to ensure that an orientation of a face in the outputted image is same with that in the target face image, it is required to perform an anti-face-alignment to the fourth face image. Alternatively, the anti-face-alignment is performed to the fourth face image to obtain the sixth face image. The loss function is performed to rectify the sixth image to obtain the fifth image, thereby improving the image effect.

The loss function is a network image trained through a neural liked network, for rectifying image loss after the face changing, thereby improving the image effect.

It is to be illustrated that, the changed second face image does not clear the facial features of the second face image up. That is to say, after the face changing, the second face image contains the facial features of the first face image and the facial features of the second face image.

Figure 4:
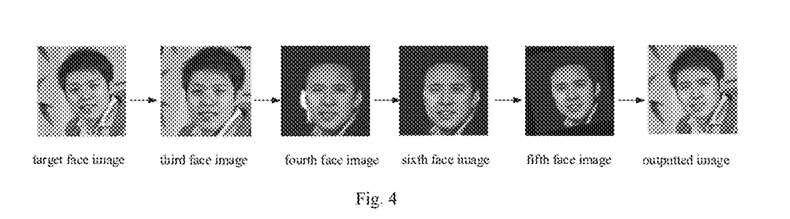
FIG. 4 is a schematic diagram illustrating another method for changing faces provided in in embodiments of the present disclosure.

For example, taking a scene of changing face illustrated in FIG. 4 as an example, the third face image is obtained by performing the face alignment to the second face image of the target face image. The fourth face image is obtained by replacing the facial features of the third face image with the facial features of the first face image. The sixth face image is obtained by performing the anti-face-alignment to the fourth face image. The fifth face image is obtained by rectifying the sixth face image with the loss function. With the above processes, the image effect may be improved. The fifth face image is combined with rest of the target face image except the second face image to obtain the outputted image. Therefore, the image effect may be improved after the face changing, and interestingness is improved.

At block 209, the N target speech segments are merged with the M target video segments obtain an outputted video.

For example, the target character records an inputted video because he is angry when waiting for others too long. The character's features are determined according to the block 103 as: male, 30 years old, anger 80%, the second face image is determined as Incredible Hulk, and the second sound is determined as Cristiano Ronaldo, the language is specified as English. Therefore, a final obtained video is with a face of Hulk and a speech of Cristiano Ronaldo.

In the method for processing a video illustrated as FIG. 3, the inputted video is divided into the A first video segments according to the preset period or the playing period of the inputted video and the inputted video is divided into the B first speech segments according to the preset volume threshold, which may reduce the complexity of processing the whole inputted video, thereby improving a speed of processing the video. Only the M second video segments including the first face image of the target character and the N second speech segments including the first sound of the target character are obtained, thereby improving extracting efficiency. The second face image matched with the target character and the second sound are determined according to the first representation information of the first face image extracted from each of the M second video segments. The first face image included in the M second video segments is replaced with the second face image, so as to obtain the M target video segments. The N target speech segments are obtained by merging the N target speech text files obtained by performing the speech processing to the N second speech segments with the second sound. The N target speech segments and the M second video segments are merged to obtain the outputted video. The character's features that are only recognized in still images are extended to videos, the first face image in the video is replaced, and the first sound in the video is processed and changed, application interestingness and practicability are improved.

Figure 5:
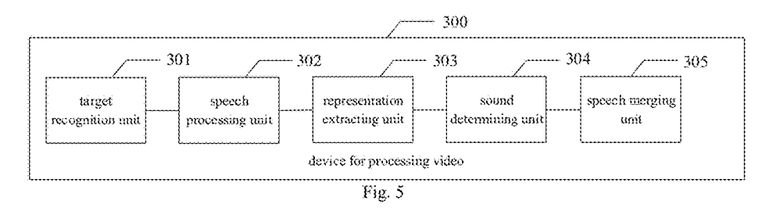
FIG. 5 is a block diagram illustrating a device for processing a video provided in embodiments of the present disclosure.

With reference to FIG. 5, FIG. 5 is a block diagram illustrating a device for processing a video provided in embodiments of the present disclosure. The device 300 may include a target recognition unit 301, a speech processing unit 302, a representation extracting unit 303, a sound determining unit 304 and a speech merging unit 305.

The target recognition unit 301 is configured to perform a target recognition to A first video segments and B first speech segments to obtain M second video segments and N second speech segments. The A first video segments and the B first speech segments are obtained by dividing an inputted video. The M second video segments include a first face image of a target character. The N second speech segments include a first sound of the target character. A is an integer greater than 1, B is a positive integer M is a positive integer less than or equal to A, and N is a positive integer less than or equal to B.

The speech processing unit 302 is configured to perform a speech processing to the N second speech segments to obtain N target speech text files. The speech segments correspond to the target speech text files one by one.

The representation extracting unit 303 is configured to extract first representation information of the first face image from the M second video segments to obtain Q pieces of first representation information Q is an integer greater than or equal to M.

The sound determining unit 304 is configured to determine a second sound matched with the target character according to the Q pieces of first representation information.

The speech merging unit 305 is configured to merge the second sound with the N target speech text files to obtain N target speech segments. The target speech text files correspond to the target speech segments one by one.

In the device for processing a video illustrated as FIG. 5, the inputted video is divided into the A first video segments and the B first speech segments, the M second video segments are obtained by selecting video segments including the first face image of the target character from the A first video segments, and the N second speech segments are obtained by selecting speech segments including the first sound of the target character from the B first speech segments. That is to say, by only extracting the video segments and the speech segments corresponding to the target character, extracting efficiency may be improved. The second sound matched with the target character is determined according to the first representation information of the first face image extracted from each of the M second video segments. The N target speech text files obtained by performing speech processing to the N second speech segments are matched with the second sound to obtain the N target speech segments (that is the target speech segments are played through the second sound), application practicability is improved.

Figure 6:
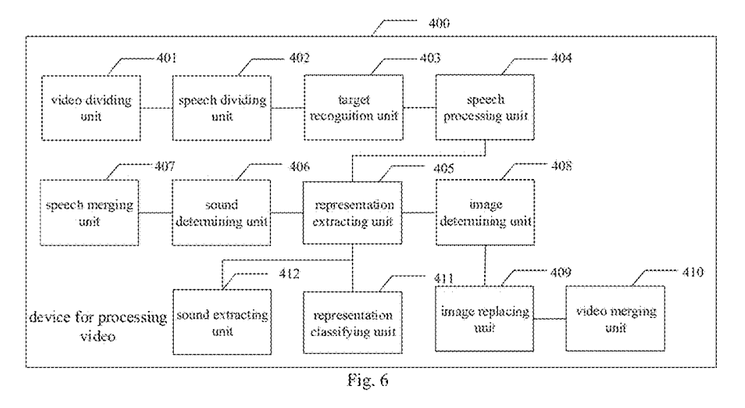
FIG. 6 is a block diagram illustrating another device for processing a video provided in embodiments of the present disclosure.

With reference to FIG. 6, FIG. 6 is a block diagram illustrating another device for processing a video provided in embodiments of the present disclosure. The device 400 may include a video dividing unit 401, a speech dividing unit 402, a target recognition unit 403, a speech processing unit 404, a representation extracting unit 405, a sound determining unit 406, a speech merging unit 407, an image determining unit 408, an image replacing unit 409 and a video merging unit 410.

The video dividing unit 401 is configured to divide the inputted video into A first video segments according to a preset period or a playing period of the inputted video.

The speech dividing unit 402 is configured to divide the inputted video into B first speech segments according to a preset volume threshold.

The target recognition unit 403 is configured to perform a target recognition to the A first video segments and the B first speech segments to obtain M second video segments including a first face image of a target character and N second speech segments including a first sound of the target character. A is an integer greater than 1, B is a positive integer, M is a, positive integer less than or equal to A, and N is a positive integer less than or equal to B.

The speech processing unit 404 is configured to perform a speech processing to the N second speech segments to obtain N target speech text files. The speech segments correspond to the target speech text files one by one.

The representation extracting unit 405 is configured to extract first representation information of the first face image from the M second video segments to obtain Q pieces of first representation information. Q is an integer greater than or equal to M.

The sound determining unit 406 is configured to determine a second sound matched with the target character according to the Q pieces of first representation information.

The speech merging unit 407 is configured to merge the second sound with the N target speech text files to obtain N target speech segments. The target speech text files correspond to the target speech segments one by one.

The image determining unit 408 is configured to determine a second face image matched with the target character according to the Q pieces of first representation information.

The image replacing unit 409 is configured to replace the first face image in the M second video segments with the second face image to obtain M target video segments. The video segments correspond to the target video segments one by one.

The video merging unit 410 is configured to merge the N target speech segments with the M target video segments to obtain an outputted video.

Figure 6A:
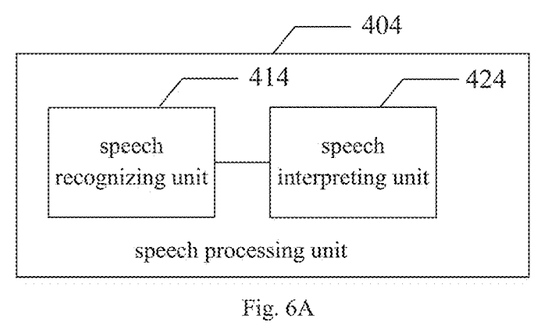
FIG. 6A is a block diagram illustrating a speech processing unit provided in embodiments of the present disclosure.

Alternatively, as illustrated in FIG. 6A, the speech processing unit 404 includes a speech recognizing unit 414 and a speech translating unit 424.

The speech recognizing unit 414 is configured to perform a speech recognition to the N second speech segments to obtain N text files. The speech segments correspond to the text files one by one.

The speech translating unit 424 is configured to translate the N text files according to a specified language to obtain the N target speech text files. The text files correspond to the target speech text files one by one.

Alternatively, the representation extracting unit 405 is configured to perform a first representation information extraction to the first face image of each of the M second video segments or the first face image of each of L frames including the first face image in the M second video segments, so as to obtain the Q pieces of first representation information, where L is a positive integer.

Alternatively, the device further includes a representation classifying unit 411.

The representation classifying unit 411 is configured to classify the Q pieces of first representation information to obtain P classes of first representation information, where P is a positive integer less than or equal to Q; and to determine the second sound according to one of the P classes with a longest playing period among the inputted video.

Alternatively, the device further includes a sound extracting unit 412.

The sound extracting unit 412 is configured to extract second representation information of the first sound from the N second speech segments to obtain R pieces of second representation information, where R is an integer greater than or equal to N; and to determine the second sound according to the Q pieces of first representation information and the R pieces of second representation information.

In the device for processing a video illustrated as FIG. 6, the inputted video is divided into the A first video segments and the B first speech segments, and the M second video segments are obtained by selecting video segments including the first face image of the target character from the A first video segments, and the N second speech segments are obtained by selecting speech segments including the first sound of the target character from the B first speech segments. That is to say, by only extracting the video segments and the speech segments corresponding to the target character, extracting efficiency may be improved. The character's features are determined according to the first representation information of the first face image extracted from each of the M second video segments, and the second face image and the second sound are determined according to the character's features. The first face image in the M second video segments is replaced with the second face image, so as to obtain the M target video segments. The N target speech text files obtained by performing speech processing to the N second speech segments are merged with the second sound to obtain the N target speech segments. The N target speech segments are merged with the M second video segments to obtain a processed inputted video. The character's features that are only recognized in still images are extended to videos, the first face image in the video is replaced, and the first sound in the video is processed and changed, application interestingness and practicability are improved.

Figure 7:
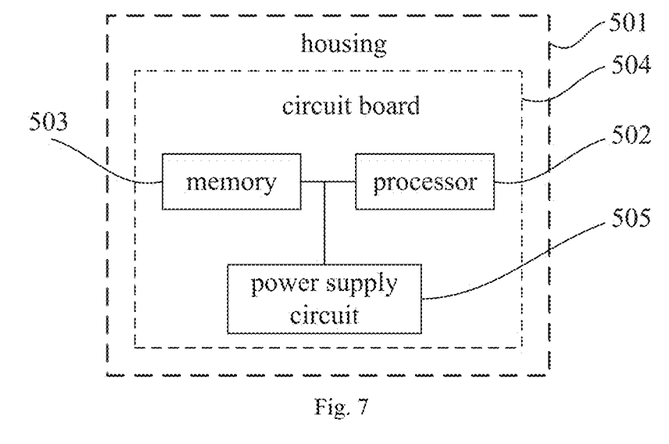
FIG. 7 is a block diagram illustrating an electronic device provided in embodiments of the present disclosure.

With reference to FIG. 7, FIG. 7 is a block diagram illustrating an electronic device provided in embodiments of the present disclosure. The electronic device may be a phone, a tablet computer and the like. As illustrated in FIG. 7, the electronic device may include a housing 501, a processor 502, a memory 503, a circuit board 504 and a power supply circuit 505. The circuit board 504 is enclosed by the housing 501. The processor 502 and the memory 503 are positioned on the circuit board 504. The power supply circuit 505 is configured to provide power for respective circuits or components of the electronic device. The memory 503 is configured to store executable program codes. The processor 502 is configured to run a program corresponding to the executable program codes by reading the executable program codes stored in the memory 503, to perform the followings.

A target recognition is performed to A first video segments and B first speech segments to obtain M second video segments and N second speech segments. The A first video segments and the B first speech segments are obtained by dividing an inputted video. The M second video segments include a first face image of a target character. The N second speech segments include a first sound of the target character. A is an integer greater than 1, B is a positive integer, M is a positive integer less than or equal to A, and N is a positive integer less than or equal to B.

A speech processing is performed to the N second speech segments to obtain N target speech text files. The N second speech segments correspond to the N target speech text files one by one.

First representation information of the first face image is extracted from the M second video segments to obtain Q pieces of first representation information. Q is an integer greater than or equal to M.

A second sound matched with the target character is determined according to the Q pieces of first representation information.

The second sound is merged with the N target speech text files to obtain N target speech segments. The N target speech text files correspond to the N target speech segments one by one.

As a possible implementation, in an aspect of performing a speech processing to the N second speech segments to obtain N target speech text files, the processor 502 is configured to execute the followings.

A speech recognition is performed to the N second speech segments to obtain N text files. The N second speech segments correspond to the N text files one by one.

The N text files are translated according to a specified language to obtain the N target speech text files. The N text files correspond to the N target speech text files one by one.

As a possible implementation, in an aspect of extracting first representation information of the first face image from the M second video segments to obtain Q pieces of first representation information, the processor 502 is configured to execute the followings.

A first representation information extraction is performed to the first face image of each of the M second video segments or the first face image of each of L frames including the first face image in the M second video segments, so as to obtain the Q pieces of first representation information, where L is a positive integer.

As a possible implementation, in an aspect of determining a second sound matched with the target character according to the Q pieces of first representation information, the processor 502 is configured to execute the followings.

The Q pieces of first representation information are classified to obtain P classes of first representation information. P is a positive integer less than or equal to Q.

The second sound is determined according to one of the P classes with a longest playing period among the inputted video.

As a possible implementation, after the Q pieces of first representation information are obtained, the processor 502 is configured to execute the followings.

A second face image matched with the target character is determined according to the Q pieces of first representation information.

The first face image in the M second video segments is replaced with the second face image to obtain M target video segments. The M video segments correspond to the M target video segments one by one.

The N target speech segments are merged with the M target video segments to obtain an outputted video.

As a possible implementation, before the target recognition is performed to A first video segments and B first speech segments obtained by dividing an inputted video, the processor 502 is configured to execute the followings.

The inputted video is divided into the A first video segments according to a preset period or a playing period of the inputted video.

The inputted video is divided into the B first speech segments according to a preset volume threshold.

As a possible implementation, the processor 502 is configured to execute the followings.

Second representation information of the first sound is extracted from the N second speech segments to obtain R pieces of second representation information. R is an integer greater than or equal to N.

The second sound is determined according to the Q pieces of first representation information and the R pieces of second representation information.

In the electronic device illustrated as FIG. 7, the inputted video is divided into the A first video segments and the B first speech segments, and the M second video segments are obtained by selecting video segments including the first face image of the target character from the A first video segments, and the N second speech segments are obtained by selecting speech segments including the first sound of the target character from the B first speech segments. That is to say, by only extracting the video segments and the speech segments corresponding to the target character, extracting efficiency may be improved. The second sound matched with the target character is determined according to the first representation information of the first face image extracted from each of the M second video segments. The N target speech text files obtained by performing speech processing to the N second speech segments are merged with the second sound to obtain the N target speech segments (that is the target speech segments are played through the second sound), application practicability is improved.

In an embodiment, a non-transitory computer readable storage medium is provided. The non-transitory computer readable storage medium has computer programs stored therein. When the computer programs are executed by a processor, the method for processing a video according to embodiment one or embodiment two is executed.

In an embodiment, an application is provided. When the application is running, the method for processing a video according to embodiment one or embodiment two is executed.

In embodiments provided in the present disclosure, it may be understood that, the disclosed system, device and method may be realized through other manners. For example, device embodiments described above are merely schematically. For example, a division of modules or units is a logic functional division. In practice, other division manners may be utilized. For example, a plurality of units or components may be combined or integrated into another system, or some feature may be omitted or not executed. For another point, coupling or direct coupling or communicational connections shown or discussed herein are realized through some interfaces. Indirect coupling or communicational connections between devices or units may be electrically, mechanically or in other forms.

The above units described as separated parts may be or may be not physically separated. Parts displayed as units may be or may be not physical units, and they may be located at same position or may be distributed to a plurality of network units. A part of or all of units may be selected according to actual requirements to realize solutions of embodiments of the present disclosure.

In addition, each function cell of the embodiments of the present disclosure may be integrated in a processing module, or these cells may be separate physical existence, or two or more cells are integrated in a processing module. The integrated module may be realized in a form of hardware or in a form of software function modules.

When the integrated module is realized in a form of software function module and is sold or used as a standalone product, the integrated module may be stored in a computer readable storage medium. Based on this understanding, a part of or all of technical solutions of the present disclosure essentially contributing to the prior art, or a part of or all of the technical solutions may be embodied in a form of a software product. The computer software product may be stored in a storage medium including several instructions such that a computer device (may be a personal computer, a server, a network device or the like), or a processor executes all of or a part of blocks of the method provided in embodiments of the present disclosure. The storage medium may include: a USB drive, a mobile hard disk drive, Read-Only Memory (ROM), Random Access Memory (RAM) a magnetic tapes, Compact Disc, and various medium that may store program instructions.

The above embodiments are merely to describe technical solutions of the present disclosure, but not to limit the present disclosure. Changes and alternatives made by those skilled in the art within a technical scope disclosed by the present disclosure should be covered in a protective scope of the present disclosure. Therefore, the protective scope of the present disclosure is determined according to the protective scope of pending claims.

What is claimed is:

1. A method for processing a video, comprising:
performing a target recognition to A first video segments and B first speech segments to obtain M second video segments and N second speech segments, wherein the A first video segments and the B first speech segments are obtained by dividing an inputted video, the M second video segments comprise a first face image of a target character, the N second speech segments comprise a first sound of the target character, A is an integer greater than 1, B is a positive integer, M is a positive integer less than or equal to A, and N is a positive integer less than or equal to B;
performing a speech processing to the N second speech segments to obtain N target speech text files, wherein the N second speech segments correspond to the N target speech text files one by one;
extracting first representation information of the first face image from the M second video segments to obtain Q pieces of first representation information, wherein Q is an integer greater than or equal to M;
determining a second sound matched with the target character according to the Q pieces of first representation information; and
merging the second sound with the N target speech text files to obtain N target speech segments, wherein the N target speech text files correspond to the N target speech segments one by one.

2. The method according to claim 1, wherein performing a speech processing to the N second speech segments to obtain N target speech text files comprises:
performing a speech recognition to the N second speech segments to obtain N text files, wherein the N second speech segments correspond to the N text files one by one; and
translating the N text files according to a specified language to obtain the N target speech text files, wherein the N text files correspond to the N target speech text files one by one.

3. The method according to claim 1, wherein, extracting first representation information of the first face image from the M second video segments to obtain Q pieces of first representation information comprises:
performing a first representation information extraction to the first face image of each of the M second video segments or the first face image of each of L frames comprising the first face image in the M second video segments, so as to obtain the Q pieces of first representation information, wherein L is a positive integer.

4. The method according to claim 1, wherein determining a second sound matched with the target character according to the Q pieces of first representation information comprises:
classifying the Q pieces of first representation information to obtain P classes of first representation information, wherein P is a positive integer less than or equal to Q; and
determining the second sound according to one of the P classes with a longest playing period among the inputted video.

5. The method according to claim 1, wherein, after obtaining the Q pieces of first representation information, the method further comprises:
determining a second face image matched with the target character according to the Q pieces of first representation information;
replacing the first face image in the M second video segments with the second face image to obtain M target video segments, wherein the M video segments correspond to the M target video segments one by one; and
merging the N target speech segments with the M target video segments to obtain an outputted video.

6. The method according to claim 5, further comprising:
pre-processing the second face image to obtain a third face image;
replacing facial features of the third face image with those of the first image face to obtain a fourth face image;
rectifying the fourth face image with a loss function to obtain a fifth face image;
merging the fifth face image with rest of the target face image except the second face image, to obtain an outputted image.

7. The method according to claim 6, wherein the pre-processing comprises at least one of a face alignment, an image enhancement and a normalization.

8. The method according to claim 1, wherein, before performing a target recognition to A first video segments and B first speech segments, the method further comprises:
dividing the inputted video into the A first video segments according to a preset period or a playing period of the inputted video; and
dividing the inputted video into the B first speech segments according to a preset volume threshold.

9. The method according to claim 1, further comprising:
extracting second representation information of the first sound from the N second speech segments to obtain R pieces of second representation information, wherein R is an integer greater than or equal to N; and
determining the second sound according to the Q pieces of first representation information and the R pieces of second representation information.

10. An electronic device, comprising: a housing, a processor, a memory, a circuit board and a power supply circuit; wherein the circuit board is enclosed by the housing; the processor and the memory are positioned on the circuit board; the power supply circuit is configured to provide power for respective circuits or components of the electronic device; the memory is configured to store executable program codes; and the processor is configured to run a program corresponding to the executable program codes by reading the executable program codes stored in the memory, to perform a method for processing a video, the method comprising:

performing a target recognition to A first video segments and B first speech segments to obtain M second video segments and N second speech segments, wherein the A first video segments and the B first speech segments are obtained by dividing an inputted video, the M second video segments comprise a first face image of a target character, the N second speech segments comprise a first sound of the target character, A is an integer greater than 1, B is a positive integer, M is a positive integer less than or equal to A, and N is a positive integer less than or equal to B;
performing a speech processing to the N second speech segments to obtain N target speech text files, wherein the N second speech segments correspond to the N target speech text files one by one;
extracting first representation information of the first face image from the M second video segments to obtain Q pieces of first representation information, wherein Q is an integer greater than or equal to M;
determining a second sound matched with the target character according to the Q pieces of first representation information; and
merging the second sound with the N target speech text files to obtain N target speech segments, wherein the N target speech text files correspond to the N target speech segments one by one.

11. The electronic device according to claim 10, wherein the processor is configured to perform a speech processing to the N second speech segments to obtain N target speech text files by acts of:
performing a speech recognition to the N second speech segments to obtain N text files, wherein the N second speech segments correspond to the N text files one by one; and
translating the N text files according to a specified language to obtain the N target speech text files, wherein the N text files correspond to the N target speech text files one by one.

12. The electronic device according to claim 10, wherein the processor is configured to extract first representation information of the first face image from the M second video segments to obtain Q pieces of first representation information by acts of:
performing a first representation information extraction to the first face image of each of the M second video segments or the first face image of each of L frames comprising the first face image in the M second video segments, so as to obtain the Q pieces of first representation information, wherein L is a positive integer.

13. The electronic device according to claim 10, wherein the processor is configured to determine a second sound matched with the target character according to the Q pieces of first representation information by acts of:
classifying the Q pieces of first representation information to obtain P classes of first representation information, wherein P is a positive integer less than or equal to Q; and
determining the second sound according to one of the P classes with a longest playing period among the inputted video.

14. The electronic device according to claim 10, wherein the processor is configured to, after obtaining the Q pieces of first representation information, perform acts of:
determining a second face image matched with the target character according to the Q pieces of first representation information;

replacing the first face image in the M second video segments with the second face image to obtain M target video segments, wherein the M video segments correspond to the M target video segments one by one; and merging the N target speech segments with the M target video segments to obtain an outputted video.

15. The electronic device according to claim 14, wherein processor is configured to perform acts of:

pre-processing the second face image to obtain a third face image;

replacing facial features of the third face image with those of the first image face to obtain a fourth face image;

rectifying the fourth face image with a loss function to obtain a fifth face image;

merging the fifth face image with rest of the target face image except the second face image, to obtain an outputted image.

16. The electronic device according to claim 15, wherein the pre-processing comprises at least one of a face alignment, an image enhancement and a normalization.

17. The electronic device according to claim 10, wherein the processor is configured to, before performing a target recognition to A first video segments and B first speech segments, perform acts of:

dividing the inputted video into the A first video segments according to a preset period or a playing period of the inputted video; and dividing the inputted video into the B first speech segments according to a preset volume threshold.

18. The electronic device according to claim 10, wherein the processor is configured to perform acts of:

extracting second representation information of the first sound from the N second speech segments to obtain R pieces of second representation information, wherein R is an integer greater than or equal to N; and determining the second sound according to the Q pieces of first representation information and the R pieces of second representation information.

19. A non-transitory computer readable storage medium, having computer programs stored therein, when the computer programs are executed by a processor, a method for processing a video is realized, the method comprising:

performing a target recognition to A first video segments and B first speech segments to obtain M second video segments and N second speech segments, wherein the A first video segments and the B first speech segments are obtained by dividing an inputted video, the M second video segments comprise a first face image of a target character, the N second speech segments comprise a first sound of the target character A is an integer greater than 1, B is a positive integer, M is a positive integer less than or equal to A, and N is a positive integer less than or equal to B;

performing a speech processing to the N second speech segments to obtain N target speech text files, wherein the N second speech segments correspond to the N target speech text files one by one;

extracting first representation information of the first face image from the M second video segments to obtain Q pieces of first representation information, wherein Q is an integer greater than or equal to M;

determining a second sound matched with the target character according to the Q pieces of first representation information; and merging the second sound with the N target speech text files to obtain N target speech segments, wherein the N target speech text files correspond to the N target speech segments one by one.

20. The non-transitory computer readable storage medium according to claim 19, wherein performing a speech processing to the N second speech segments to obtain N target speech text files comprises:

performing a speech recognition to the N second speech segments to obtain N text files, wherein the N second speech segments correspond to the N text files one by one; and translating the N text files according to a specified language to obtain the N target speech text files, wherein the N text files correspond to the N target speech text files one by one.

* * * * *